United States Patent
Yoshino

(10) Patent No.: US 8,391,644 B2
(45) Date of Patent: Mar. 5, 2013

(54) IMAGE PROCESSING APPARATUS, IMAGE PROCESSING METHOD, STORAGE MEDIUM STORING IMAGE PROCESSING PROGRAM, AND ELECTRONIC DEVICE

(75) Inventor: Koichiro Yoshino, Tokyo (JP)

(73) Assignee: Olympus Corporation, Tokyo (JP)

(*) Notice: Subject to any disclaimer, the term of this patent is extended or adjusted under 35 U.S.C. 154(b) by 117 days.

(21) Appl. No.: 12/895,959

(22) Filed: Oct. 1, 2010

(65) Prior Publication Data
US 2011/0019880 A1    Jan. 27, 2011

Related U.S. Application Data

(63) Continuation of application No. PCT/JP2009/057024, filed on Mar. 31, 2009.

(30) Foreign Application Priority Data

Apr. 1, 2008    (JP) ................................. 2008-095209

(51) Int. Cl.
G06K 9/32    (2006.01)
G06K 9/00    (2006.01)

(52) U.S. Cl. ........................................ 382/294; 382/107

(58) Field of Classification Search .................. 382/107, 382/236, 294; 375/240.16, 240.12, 240.01; 348/407.1, 413.1, 416.1, 699, 700
See application file for complete search history.

(56) References Cited

U.S. PATENT DOCUMENTS

| | | | | |
|---|---|---|---|---|
| 6,157,677 A | * | 12/2000 | Martens et al. | 375/240.16 |
| 8,045,619 B2 | * | 10/2011 | Lee et al. | 375/240.16 |
| 2005/0206739 A1 | | 9/2005 | Kamoshida | |
| 2007/0002145 A1 | | 1/2007 | Furukawa | |

FOREIGN PATENT DOCUMENTS

| | | |
|---|---|---|
| JP | 05-233815 A | 9/1993 |
| JP | 2005-260481 A | 9/2005 |
| JP | 2005-269419 A | 9/2005 |
| JP | 2007-013430 A | 1/2007 |
| JP | 2007-043285 A | 2/2007 |
| JP | 2007-129587 A | 5/2007 |

OTHER PUBLICATIONS

International Search Report and Written Opinion dated Apr. 28, 2009 (in English) in counterpart International Application No. PCT/JP2009/057024.

* cited by examiner

*Primary Examiner* — Yon Couso
(74) *Attorney, Agent, or Firm* — Holtz, Holtz, Goodman & Chick, PC

(57) ABSTRACT

An image processing apparatus for performing registration processing on a plurality of images by calculating a motion vector between the plurality of images includes a motion vector measurement region setting unit that sets a plurality of motion vector measurement regions for measuring the motion vector, a motion vector calculation unit that calculates motion vectors of the plurality of motion vector measurement regions, a motion vector reliability calculation unit that calculates a reliability of the motion vectors of the plurality of motion vector measurement regions on the basis of information relating to a local magnification of an optical system used to obtain the images, and a motion vector integration processing unit that determines an inter-image motion vector by integrating the motion vectors of the plurality of motion vector measurement regions in accordance with the reliability of the motion vectors.

11 Claims, 11 Drawing Sheets

IMAGE PROCESSING APPARATUS, IMAGE PROCESSING METHOD, STORAGE MEDIUM STORING IMAGE PROCESSING PROGRAM, AND ELECTRONIC DEVICE

CROSS REFERENCE TO RELATED APPLICATIONS

This application is a continuation of International Patent Application No. PCT/JP2009/057024, filed on Mar. 31, 2009, which claims the benefit of Japanese Patent Application No. JP 2008-95209, filed on Apr. 1, 2008, which is incorporated by reference as if fully set forth.

TECHNICAL FIELD OF THE INVENTION

This invention relates to an image registration technique, an image overlapping technique, and an inter-image blur correction technique performed on a plurality of images in an electronic image pickup device/image system.

BACKGROUND OF THE INVENTION

A correlation method based on a correlation calculation and a block matching method are known as conventional means for detecting a motion vector between a plurality of images. In the block matching method, an input image signal is divided into a plurality of appropriately sized blocks (for example, 8 pixels×8 lines), a difference with a pixel located within a fixed range of a previous frame is calculated in units of these blocks, and a block position in which the sum of an absolute value of the difference is at a minimum is found. A relative deviation between images represents the motion vector of the block. A representative inter-frame motion vector is then calculated by integrating the motion vectors of the respective blocks and used to perform final image registration.

A method of determining a sum of squared intensity difference (SSD), which is a sum of squares of a difference between pixel values, or a sum of absolute intensity difference (SAD), which is a sum of absolute values of a difference between pixel values, may be employed during block matching as a method of finding a block having a high correlation. In this method, the correlation (alignment) is determined to be steadily higher as the SSD or SAD decreases. In a reference block region I and a subject block region I' of a matching operation, when pixel values in pixel positions $p \in I$ and $q \in I'$ (where p, q are quantities having two-dimensional values, I, I' are two-dimensional regions, and $p \in I$ indicates that a coordinate p is included in the region I) are set as Lp, Lq, respectively, SSD and SAD are expressed respectively by following Equations (1), (2).

$$SSD(I, I') = \sum_{p \in I, q \in I'} (Lp - Lq)^2 \quad (1)$$

$$SAD(I, I') = \sum_{p \in I, q \in I'} \|Lp - Lq\| \quad (2)$$

Alternatively, a method using a normalized cross-correlation (NCC) may be employed. As a zero average correlation, average values Ave (Lp), Ave (Lq) of the pixels $p \in I$, $q \in I'$ included respectively in the reference block region I and the subject block region I' of the matching operation are calculated, and differences with pixel values included in the respective blocks using following Equations (3), (4) are calculated.

$$Lp' = \left. \frac{Lp - Ave(Lp)}{\sqrt{\frac{1}{n}\sum_{p \in I}(Lp - Ave(Lp))^2}} \right|_{p \in I} \quad (3)$$

$$Lq' = \left. \frac{Lq - Ave(Lq)}{\sqrt{\frac{1}{n}\sum_{q \in I'}(Lq - Ave(Lq))^2}} \right|_{q \in I'} \quad (4)$$

Next, the normalized cross-correlation NCC is calculated using a following Equation (5).

$$NCC = \Sigma Lp'Lq' \quad (5)$$

A block having a large normalized cross-correlation NCC is determined to be a block having a high degree of alignment (a high correlation), and therefore a relative deviation between the block I and the block I' having the highest degree of alignment is determined.

Further, a method of detecting a number of edges in horizontal and vertical directions of a block and weighting the detected edges (JP5-233815A) and a method of performing a reliability determination on the basis of the correlation value itself (JP2005-260481A) are known as methods of evaluating the reliability of a detected motion vector.

SUMMARY OF THE INVENTION

An image processing apparatus of an aspect of the present invention for performing registration processing on a plurality of images by calculating a motion vector between the plurality of images comprises a motion vector measurement region setting unit that sets a plurality of motion vector measurement regions for measuring the motion vector, a motion vector calculation unit that calculates motion vectors of the plurality of motion vector measurement regions, a motion vector reliability calculation unit that calculates a reliability of the motion vectors of the plurality of motion vector measurement regions on the basis of information relating to a local magnification of an optical system used to obtain the images, and a motion vector integration processing unit that determines an inter-image motion vector by integrating the motion vectors of the plurality of motion vector measurement regions in accordance with the reliability of the motion vectors.

An image processing method of another aspect of the present invention for performing registration processing on a plurality of images by calculating a motion vector between the plurality of images comprises a step of setting a plurality of motion vector measurement regions for measuring the motion vector, a step of calculating motion vectors of the plurality of motion vector measurement regions, a step of calculating a reliability of the motion vectors of the plurality of motion vector measurement regions on the basis of information relating to a local magnification of an optical system used to obtain the images, and a step of determining an inter-image motion vector by integrating the motion vectors of the plurality of motion vector measurement regions in accordance with the reliability of the motion vectors.

A storage medium of yet another aspect of the present invention stores an image processing program for causing a computer to execute registration processing on a plurality of images by calculating a motion vector. The image processing program causes the computer to execute a step of setting a plurality of motion vector measurement regions for measuring the motion vector, a step of calculating motion vectors of the plurality of motion vector measurement regions, a step of calculating a reliability of the motion vectors of the plurality of motion vector measurement regions on the basis of information relating to a local magnification of an optical system used to obtain the images, and a step of determining an inter-image motion vector by integrating the motion vectors of the plurality of motion vector measurement regions in accordance with the reliability of the motion vectors.

DESCRIPTION OF THE PREFERRED EMBODIMENT

An embodiment of this invention will be described below with reference to the figures.

Figure 1:
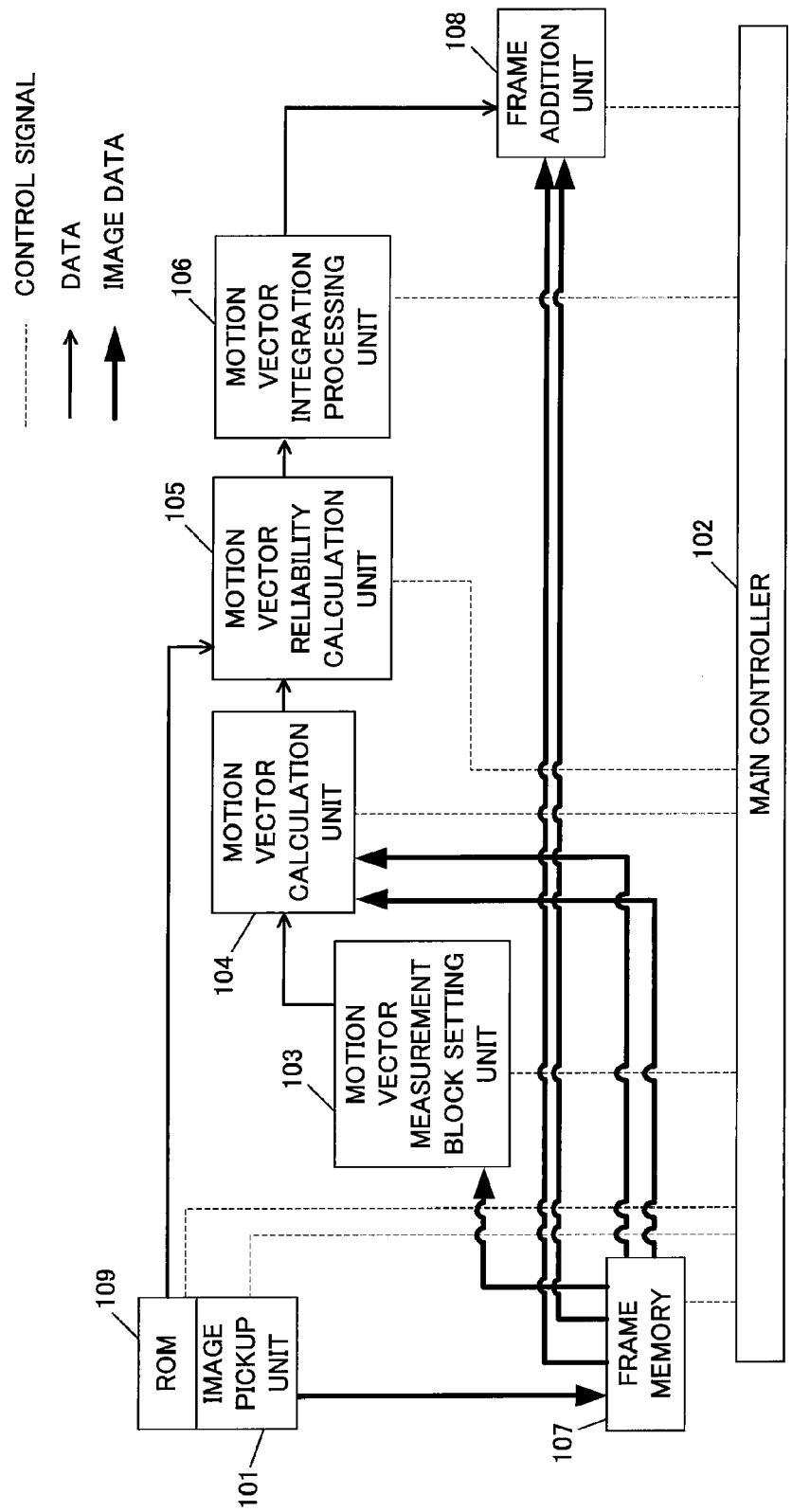
FIG. 1 is a block diagram showing the constitution of an image processing apparatus according to an embodiment.

FIG. 1 is a block diagram showing the constitution of an image processing apparatus according to an embodiment. In the figure, dotted lines indicate control signals, thin lines indicate the flow of data such as motion vectors and reliability values, and thick lines indicate the flow of image data. The image processing apparatus according to this embodiment is installed in an electronic device that is dependent on a current or an electromagnetic field to operate correctly, such as a digital camera, a digital video camera, or an endoscope.

A main controller 102 is a processor that performs operation control on the entire apparatus, and employs a CPU such as a DSP (Digital Signal Processor), for example.

A plurality of frame images captured by an image pickup unit 101 are stored temporarily in a frame memory 107. The plurality of frame data stored in the frame memory 107 include data relating to a frame (to be referred to hereafter as a reference frame) serving as a registration reference and data relating to a frame (to be referred to hereafter as a subject frame) to be registered relative to the reference frame.

A motion vector measurement block setting unit 103 sets a predetermined plurality of motion vector measurement blocks on the reference frame stored in the frame memory 107. These motion vector measurement blocks are used when the reference frame and the subject frame are registered. It should be noted that hereafter, the motion vector measurement block will occasionally be referred to simply as a "block".

Figure 2:
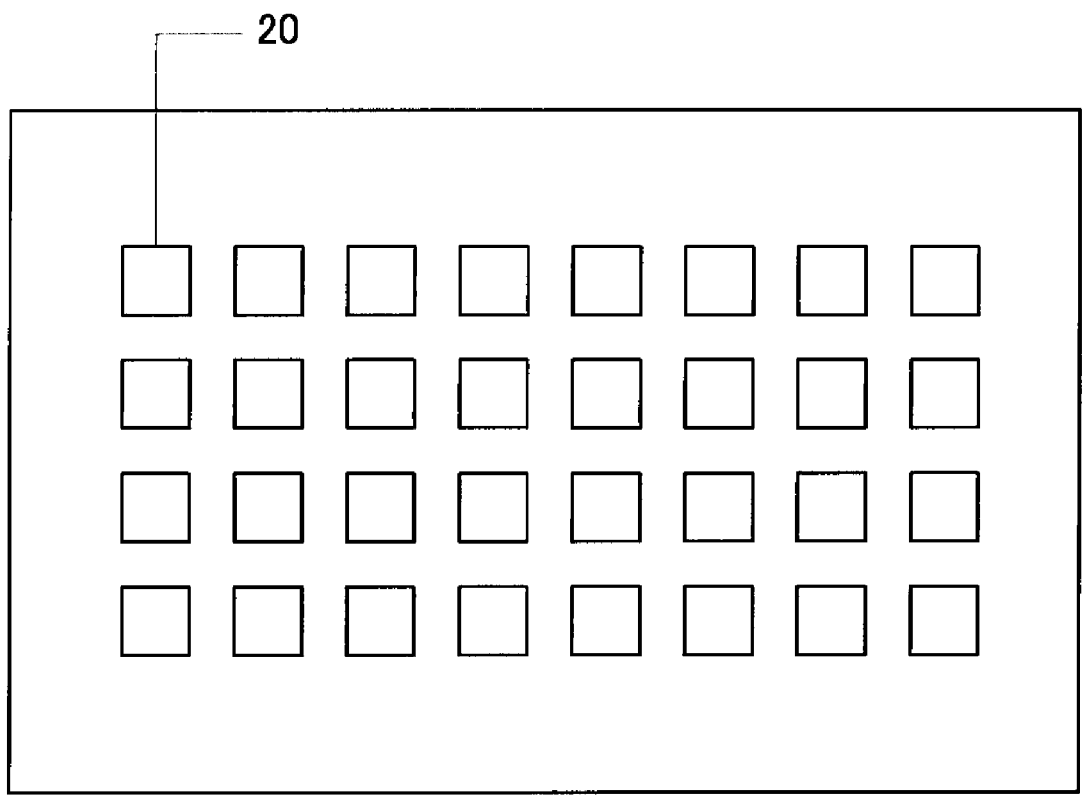
FIG. 2 is a view showing an example of motion vector measurement blocks set on a reference frame.

FIG. 2 is a view showing an example of motion vector measurement blocks 20 set on the reference frame. In the example shown in FIG. 2, the motion vector measurement blocks 20 are set on the reference frame in a lattice shape. A central coordinate of the motion vector measurement block serves as an origin of a motion vector.

A motion vector calculation unit 104 uses the image data relating to the reference frame and subject frame stored in the frame memory 107 and data relating to the motion vector measurement blocks set by the motion vector measurement block setting unit 103 to calculate a block position within the subject frame that has a high correlation with a motion vector measurement block of the reference frame. This processing may be performed through block matching, in which an alignment index such as the above-mentioned SSD, SAD or NCC is calculated, and is performed on all of the motion vector measurement blocks.

A central coordinate of the subject frame block having a high correlation is set as an endpoint of the motion vector. Accordingly, a vector extending from the central coordinate of the motion vector measurement block in the reference frame to a position coordinate of the reference frame, which corresponds to the central coordinate of the block having a high correlation in the subject frame, is set as a motion vector.

A motion vector reliability calculation unit 105 reads local magnification information relating to an optical system of the image pickup unit 101, and calculates a reliability value indicating the reliability of each motion vector calculated by the motion vector calculation unit 104. The local magnification information of the optical system is stored in advance in a ROM 109 provided in the image pickup unit 101. In this embodiment, it is assumed that the optical system of the image pickup unit 101 exhibits barrel distortion. A method of calculating the reliability of the motion vectors will be described below.

A motion vector integration processing unit 106 integrates data relating to the respective motion vectors in accordance with information relating to the reliability of the motion vectors calculated by the motion vector reliability calculation unit 105, and calculates a representative inter-frame motion vector value. The processing performed by the motion vector integration processing unit 106 will be described in detail below.

A frame addition unit 108 performs frame addition processing on the basis of the image data relating to the reference frame and subject frame stored in the frame memory 107 and correction vector data (the representative inter-image motion vector value) calculated by the motion vector integration processing unit 106.

It should be noted that an example of frame addition is illustrated in the constitution shown in FIG. 1, but moving image blur correction, in which the subject frame is registered relative to the reference frame using a correction vector, may be performed instead. In moving image blur correction, correction is performed using the correction vector such that blur is reduced on the subject frame relative to the reference frame.

Figure 3:
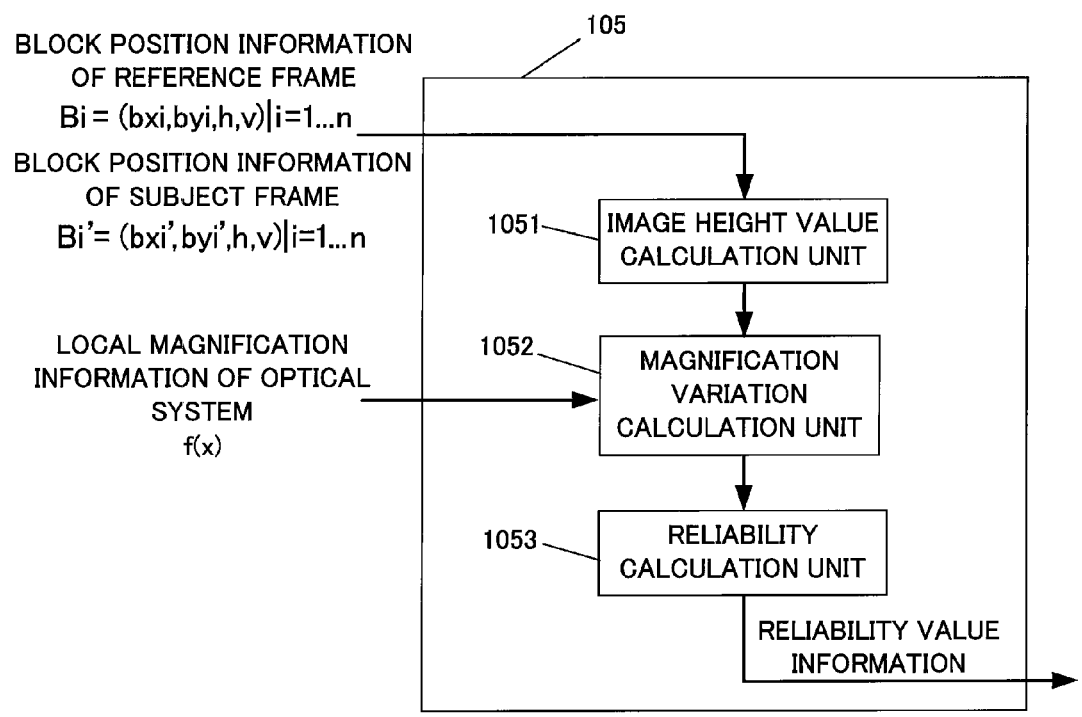
FIG. 3 is a block diagram showing in detail the constitution of a motion vector reliability calculation unit.

FIG. 3 is a block diagram showing in detail the constitution of the motion vector reliability calculation unit 105. The motion vector reliability calculation unit 105 includes an image height value calculation unit 1051, a magnification variation calculation unit 1052, and a reliability calculation unit 1053.

The image height value calculation unit 1051 calculates an image height value serving as a normalized image height at the origin and the endpoint of each motion vector using position information relating to each block of the reference frame, i.e. the origin of each motion vector, and position information relating to each block of the subject frame, i.e. the endpoint of each motion vector.

The magnification variation calculation unit 1052 calculates a magnification variation amount in the optical system at the origin and endpoint of each motion vector on the basis of the image height value at the origin and endpoint of each motion vector, calculated by the image height value calculation unit 1051, and the local magnification information of the optical system, read from the ROM 109.

The reliability calculation unit 1053 calculates the reliability of each motion vector on the basis of the magnification variation amount calculated by the magnification variation calculation unit 1052 such that the reliability is reduced when the magnification variation amount is large, i.e. when the block matching result is unreliable, and the reliability is increased when the magnification variation amount is small.

The processing performed by the image height value calculation unit 1051, magnification variation calculation unit 1052, and reliability calculation unit 1053 will be described in detail below using a flowchart shown in FIG. 4.

Figure 4:
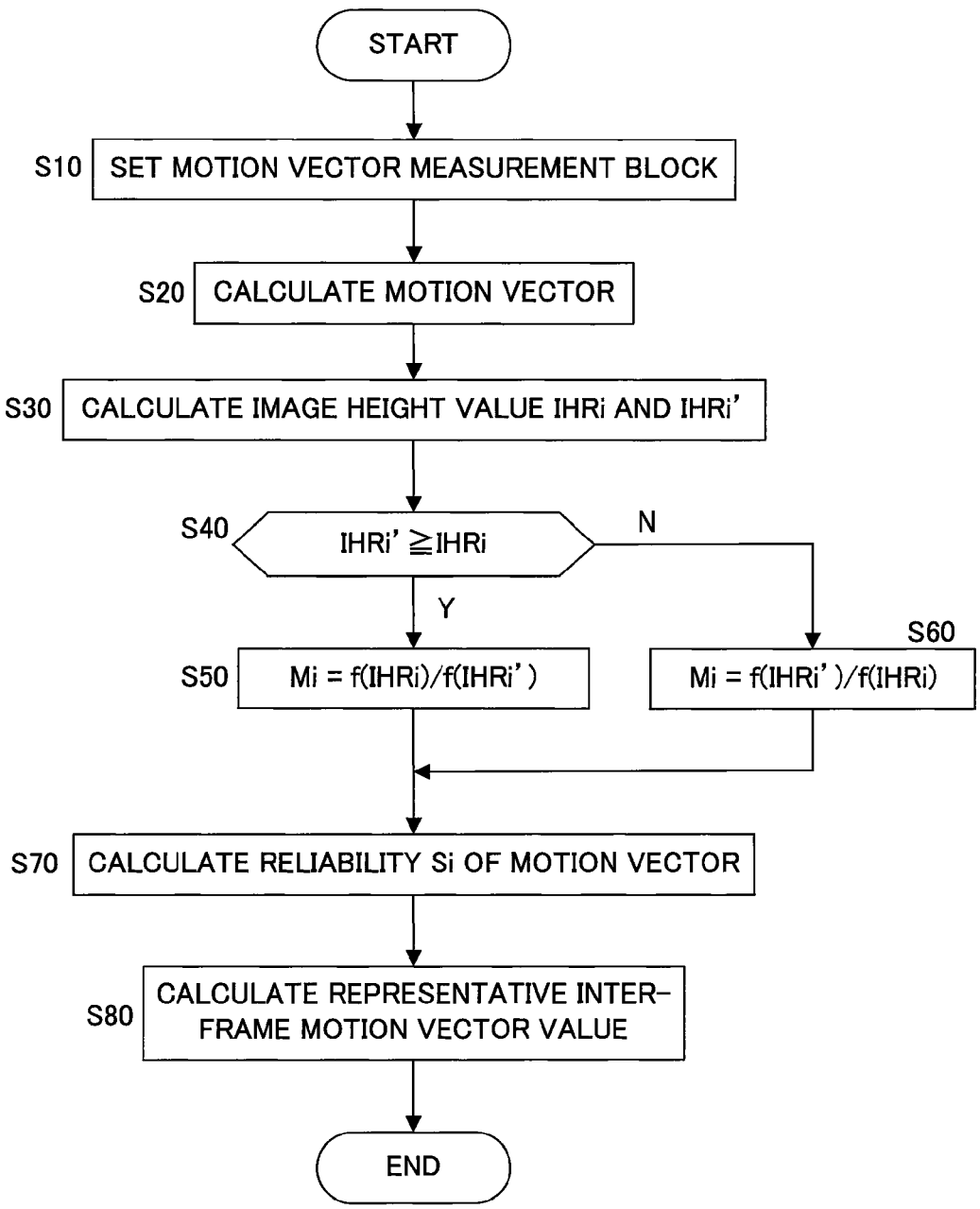
FIG. 4 is a flowchart showing a processing procedure of the processing performed by the image processing apparatus according to an embodiment.

FIG. 4 is a flowchart showing a processing procedure of the processing performed by the image processing apparatus according to an embodiment. In a step S10, the motion vector measurement block setting unit 103 sets a plurality of motion vector measurement blocks on the reference frame stored in the frame memory 107.

In a step S20, the motion vector calculation unit 104 calculates the motion vector of each motion vector measurement block.

Processing from a step S30 to a step S70 is performed by the motion vector reliability calculation unit 105. In the step S30, the image height value calculation unit 1051 calculates an image height value IHRi of an $i^{th}$ motion vector measurement block of the reference frame, which serves as the origin of an $i^{th}$ motion vector, and an image height value IHRi' of an $i'^{th}$ block of the subject frame, which is determined to have a high correlation to the $i^{th}$ motion vector measurement block and therefore serves as the endpoint of the motion vector.

Figure 5:
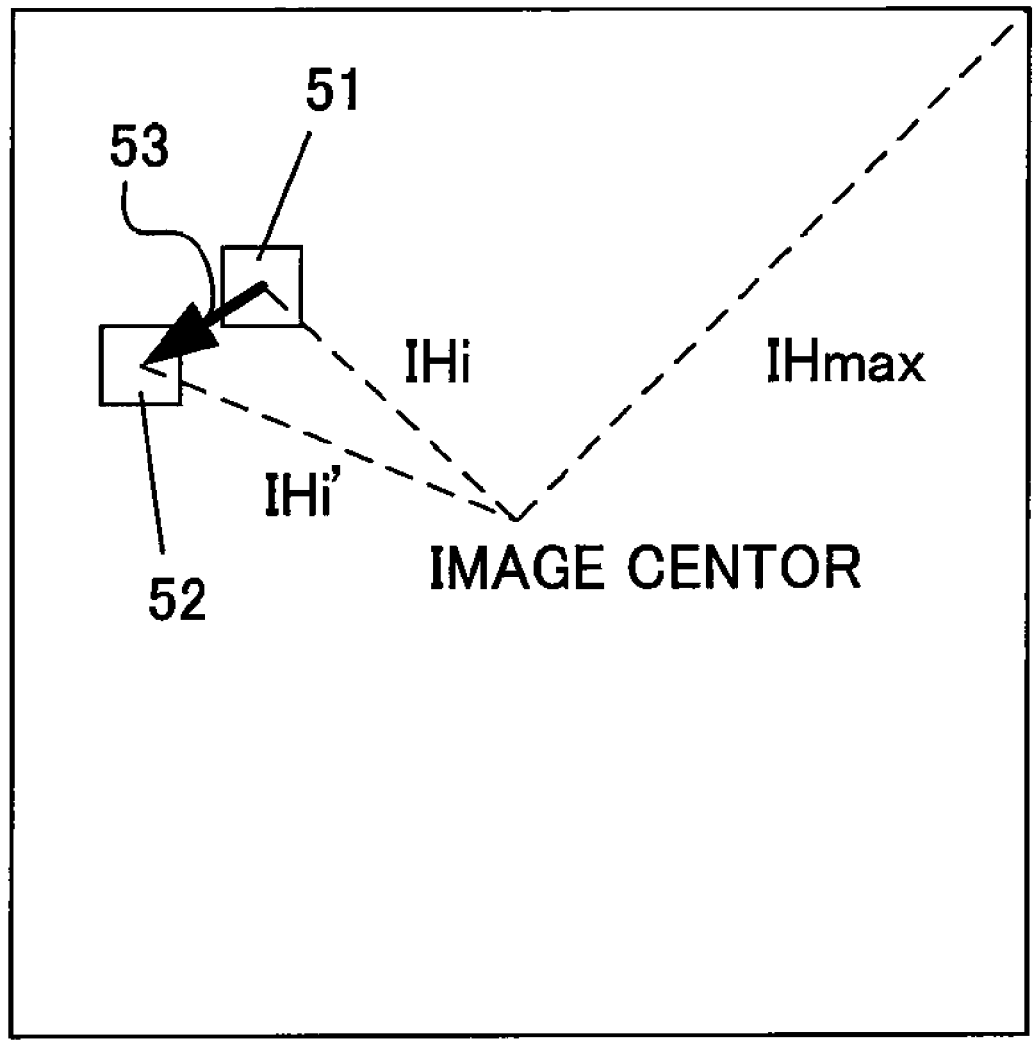
FIG. 5 is a view showing a method for calculating the image height.

Here, the image height value is a value obtained by dividing a distance IHi from an image center shown in FIG. 5 to a central coordinate of a motion vector measurement block 51 of the reference frame and a distance IHi' from the image center shown in FIG. 5 to a central coordinate of a corresponding block 52 of the subject frame, respectively, by a maximum image height IHmax. The corresponding block 52 of the subject frame is a block having a high correlation to the motion vector measurement block 51 of the reference frame, which is determined during determination of a motion vector 53 in the step S20. Further, as shown in FIG. 5, the maximum image height IHmax is a distance from the image center to the four corners of the image. When respective distances from the image center point to the four corners of the image are different, the largest of these distances, or in other words the distance between the image center point and a point furthest removed from the center point, is employed as the maximum image height IHmax.

When the central coordinate of the $i^{th}$ block 51 of the reference frame is (bxi, byi), the central coordinate of the $i'^{th}$ block 52 of the subject frame is (bxi', byi'), and the central coordinate of the image is (x0, y0), the distance IHi from the image center to the central coordinate of the block 51 of the reference frame and the distance IHi' from the image center to the central coordinate of the corresponding block 52 of the subject frame are expressed by following Equations (6), (7), respectively. Accordingly, the image height values IHRi and IHRi' are expressed by following Equations (8), (9), respectively.

$$IHi = \sqrt{(bxi-x0)^2 + (byi-y0)^2} \tag{6}$$

$$IHi' = \sqrt{(bxi'-x0)^2 + (byi'-y0)^2} \tag{7}$$

$$IHRi = IHi/IHmax \tag{8}$$

$$IHRi' = IHi'/IHmax \tag{9}$$

The processing of the steps S40 to S60 is performed by the magnification variation calculation unit 1052. In the step S40, a determination is made as to whether or not the image height value IHRi' calculated in the step S30 is equal to or greater than the image height value IHRi. When IHRi' is equal to or greater than IHRi, the routine advances to the step S50, and when IHRi' is determined to be smaller than IHRi, the routine advances to the step S60.

In the step S50 and the step S60, a magnification variation amount Mi of the optical system between the origin and endpoint of the $i^{th}$ motion vector 53 is calculated. A calculation method will now be described using FIG. 6.

Figure 6:
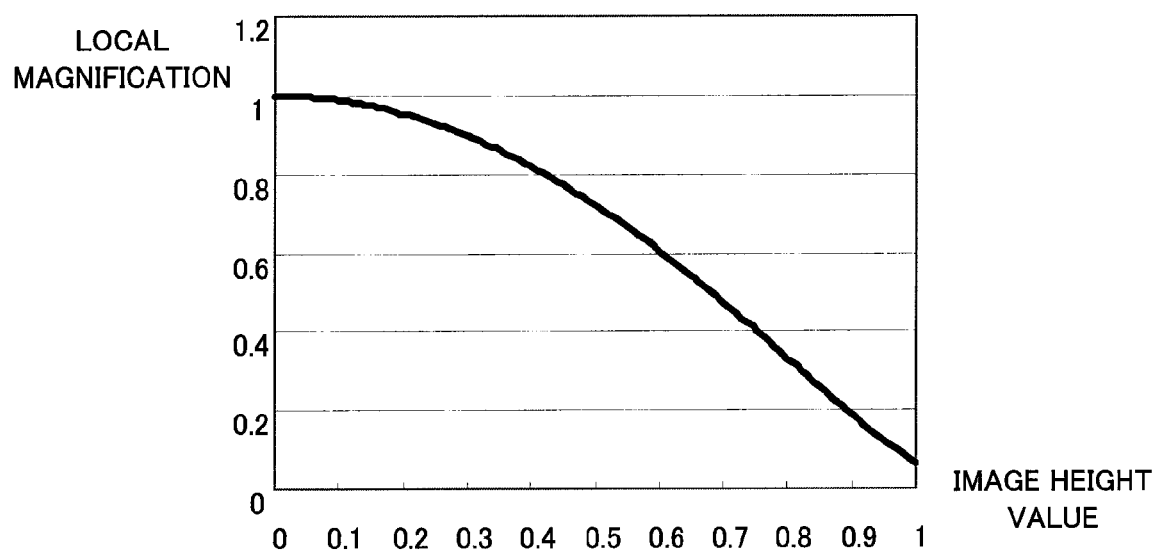
FIG. 6 is an example of a graph showing a relationship between the image height value and the local magnification of the optical system in which distortion is large.

FIG. 6 is an example of a graph showing a relationship between the image height value and the local magnification of the optical system of the image pickup unit 101, in which distortion is large. In FIG. 6, the abscissa shows the image height value and the ordinate shows a normalized local magnification. Here, the local magnification is normalized such that at image height value=0 (the image center), the local magnification is 1. As is evident from the graph shown in FIG. 6, the local magnification decreases as the image height value increases. This means that when an image of an identical object is formed in the image center and the periphery, the image on the periphery is formed smaller.

When the graph shown in FIG. 6 is approximated by a cubic equation, a following Equation (10) is obtained. It should be noted that here, x denotes the image height value and f (x) denotes the local magnification.

$$f(x) = 0.5761x^3 - 1.6534x^2 + 0.1341x + 0.9928 \tag{10}$$

The term f(x) in Equation (10) is stored in advance in the ROM 109. In this case, it is possible to store only a coefficient of the polynomial shown in Equation (10). Further, a look-up table defining the relationship between the image height value and the local magnification may be stored in advance in the ROM 109.

In the step S50, the magnification variation amount Mi of the optical system between the origin and endpoint of the $i^{th}$ motion vector 53 is calculated using a following Equation (11) by calculating a local magnification f(IHRi) at the central coordinate of the $i^{th}$ block 51 of the reference frame and a local magnification f(IHRi') at the central coordinate of the corresponding block 52 of the subject frame using Equation (10).

$$Mi = f(IHRi)/f(IHRi') \tag{11}$$

Meanwhile, in the step S60, the magnification variation amount Mi of the optical system between the origin and endpoint of the $i^{th}$ motion vector 53 is calculated using a following Equation (12) by calculating the local magnification f(IHRi) at the central coordinate of the $i^{th}$ block 51 of the reference frame and the local magnification f(IHRi') at the central coordinate of the corresponding block 52 of the subject frame.

$$Mi = f(IHRi')/f(IHRi) \tag{12}$$

When the local magnification of the optical system at the central coordinate of the block is identical in the reference frame and the subject frame, the magnification variation amount Mi is 1, and the value of Mi decreases as the amount of variation in the local magnification increases. Here, Mi is a ratio of the magnification of the optical system and does not therefore take a value of 0 or less.

Needless to say, when determining the magnification variation amount Mi, similar results can be obtained using an actual image height IHi rather than the image height value IHRi. In this case, an approximation f(x) should be determined in advance as a function indicating the relationship between the actual image height and the local magnification. Furthermore, in the above description, the relationship between the image height value and the local magnification is approximated by a cubic equation but may, if necessary, be approximated by a quadratic function, a quartic function, or greater.

In the step S70, the motion vector reliability calculation unit 105 calculates a reliability Si of the $i^{th}$ motion vector 53 using a following Equation (13). In Equation (13), C is an arbitrary coefficient.

$$Si = \exp[-C \times (1 - Mi)] \tag{13}$$

When there is no magnification variation between the target blocks of the reference frame and the subject frame, magnification variation amount Mi=1 is established, and therefore the reliability Si is 1. As described above, the value of Mi decreases as the variation amount in the local magnification increases, and therefore the value of the reliability Si decreases correspondingly. In other words, the value of the reliability Si is larger than 0 and equal to or smaller than 1.

Figure 7:
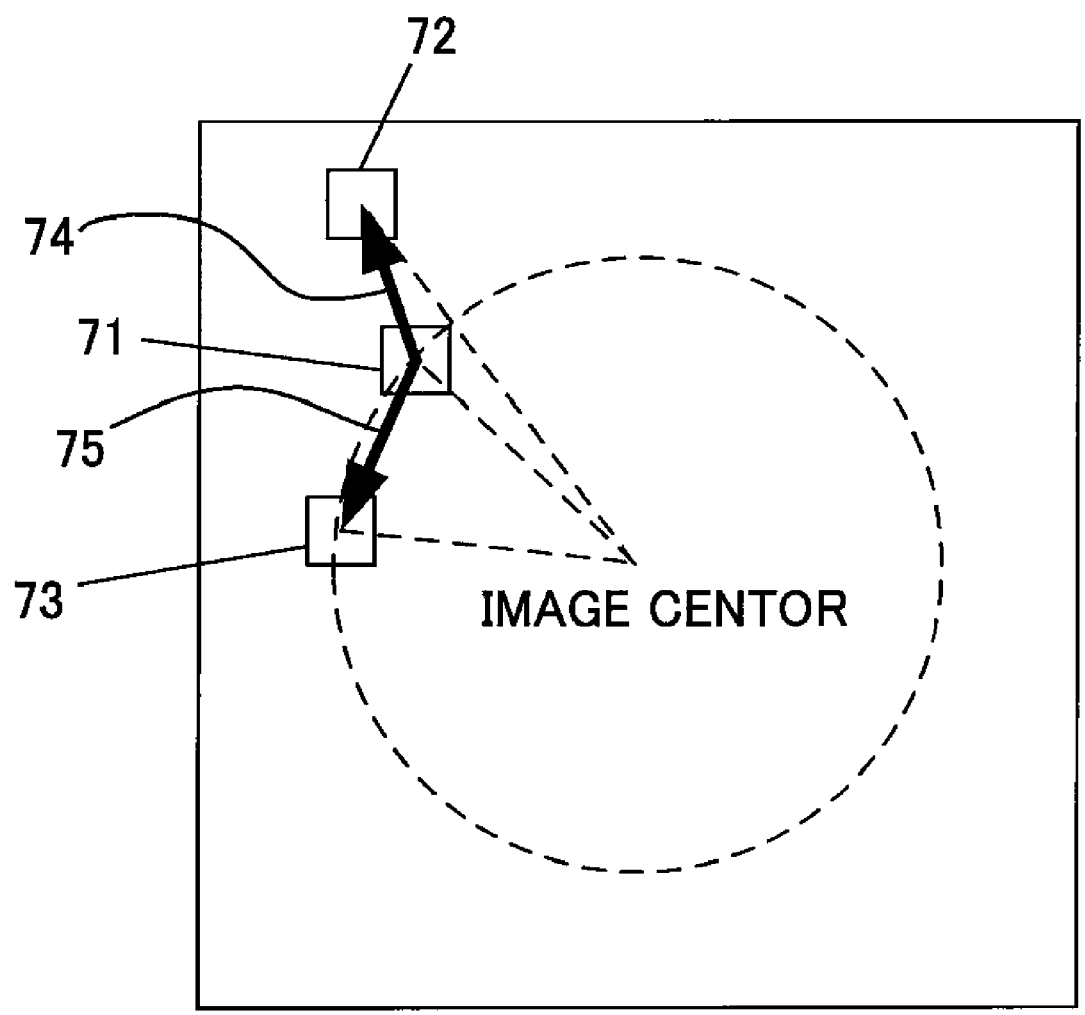
FIG. 7 is a view showing an example of a relationship between the motion vector and the reliability.

FIG. 7 is a view showing an example of a relationship between the motion vector and the reliability. In FIG. 7, a motion vector 74 is a vector extending from a motion vector measurement block 71 of the reference frame to a corresponding block 72, and a motion vector 75 is a vector extending from the motion vector measurement block 71 of the reference frame to a corresponding block 73.

As shown in FIG. 7, in the motion vector 74, the image height varies greatly and the magnification variation amount of the optical system is large. In the motion vector 75, on the other hand, the image height is substantially constant and the local magnification variation amount is small. In this case, the reliability Si of the motion vector 74, calculated using Equation (13), is lower than the reliability Si of the motion vector 75.

Further, as shown in FIG. 6, magnification variation in the optical system relative to variation in the image height is comparatively small in the vicinity of the image center (in the vicinity of an image height value of 0), and therefore, in the vicinity of the image center, a comparatively high degree of reliability is obtained even when a movement amount of the motion vector is large. Conversely, in a motion vector extending from the vicinity of the image center, in which distortion is small, toward an image edge on which distortion is large, the local magnification variation amount increases, leading to a reduction in the reliability.

In a step S80, the motion vector integration processing unit 106 calculates a representative inter-frame motion vector value $V_{Frame}$ relating to all of the motion vector measurement blocks of the reference frame using motion vector measurement results Vi determined in the step S20 and the reliability values Si determined in the step S70 in accordance with a following Equation (14), for example. It should be noted that a right side denominator is a normalization constant.

$$V_{Frame} = \frac{1}{\Sigma Si} \Sigma (Si \cdot Vi) \tag{14}$$

According to Equation (14), when the representative inter-frame motion vector value $V_{Frame}$ between the reference frame and the subject frame is calculated by integrating the motion vectors of the respective motion vector measurement blocks, a contribution of motion vectors having a low reliability value Si is reduced. As a result, the calculation precision of the inter-frame motion vector can be improved.

—Modified Example of Motion Vector Integration Processing Unit 106—

Figure 8:
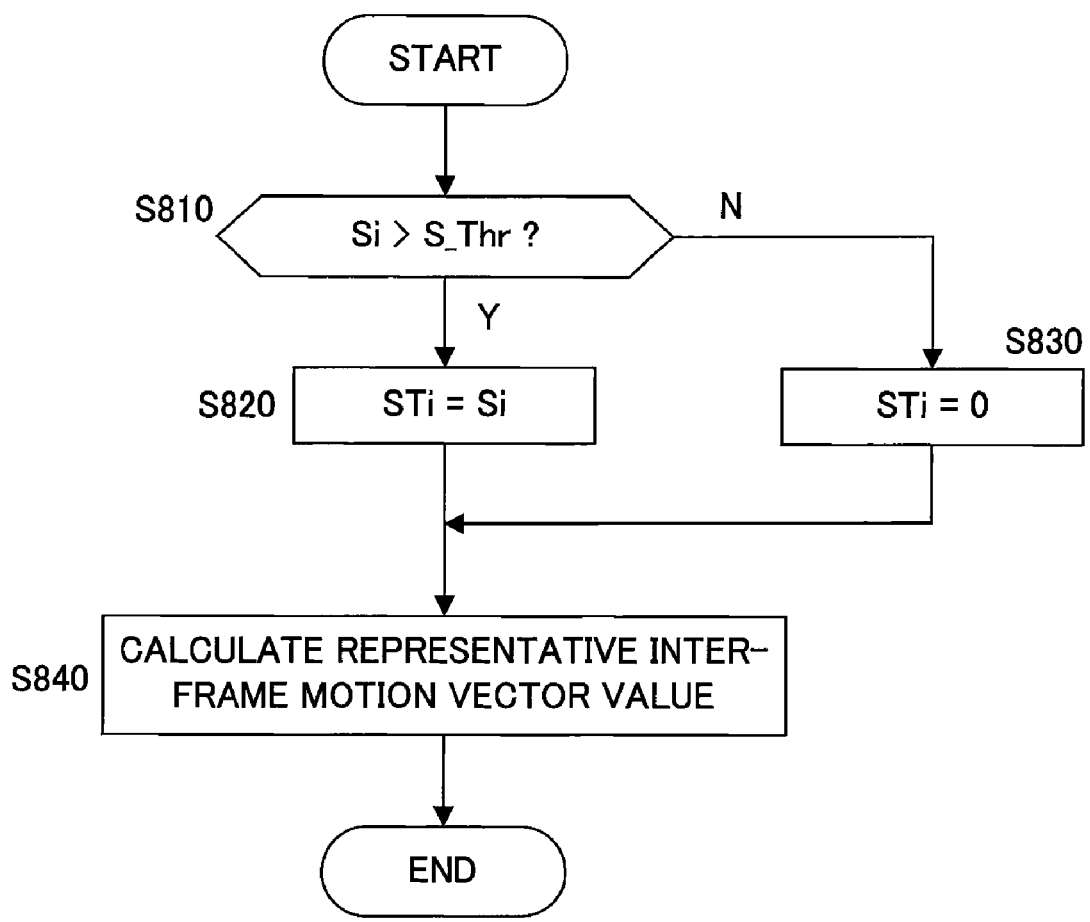
FIG. 8 is a flowchart showing a processing procedure of modified processing performed by a motion vector integration processing unit.

FIG. 8 is a flowchart showing a processing procedure of modified processing performed by the motion vector integration processing unit 106, which is performed instead of the processing of the step S80 in the flowchart shown in FIG. 4.

In a step S810, a determination is made as to whether or not the reliability Si calculated by the motion vector reliability calculation unit 105 is larger than a predetermined threshold S_Thr. When it is determined that the reliability Si is higher than the predetermined threshold S_Thr, the routine advances to a step S820, and when the reliability Si is equal to or lower than the predetermined threshold S_Thr, the routine advances to a step S830.

In the step S820, a reliability coefficient STi is substituted for the reliability Si calculated by the motion vector reliability calculation unit 105 (STi=Si), whereupon the routine advances to a step S840.

In the step S830, on the other hand, the value of the reliability coefficient STi is set at 0 (STi=0), whereupon the routine advances to the step S840.

In the step S840, the representative value $V_{Frame}$ of the motion vectors between the reference frame and the subject frame is calculated using a following Equation (15).

$$V_{Frame} = \frac{1}{\Sigma STi} \Sigma (STi \cdot Vi) \tag{15}$$

According to the processing of the flowchart shown in FIG. 8, the contribution of a motion vector in which the reliability Si is equal to or smaller than the predetermined threshold S_Thr is set at 0, and therefore the calculation precision of the representative value $V_{Frame}$ of the motion vectors can be improved even further.

With the image processing apparatus according to the embodiment described above, an inter-image motion vector is determined by setting a plurality of motion vector measurement blocks for measuring motion vectors on an image, calculating the motion vectors of the plurality of set motion vector measurement blocks, calculating a reliability of each motion vector on the basis of information relating to a local magnification of an optical system used to obtain the image, and integrating the motion vectors of the plurality of motion vector measurement blocks in accordance with the calculated reliability of each motion vector. The reliability of the motion vector of each motion vector measurement block is calculated on the basis of the local magnification information of the optical system, and therefore a motion vector of a block having a large local magnification variation amount that should not be detected can be given a low evaluation or excluded. As a result, an accurate, reliable inter-frame representative motion vector can be calculated.

Figure 9:
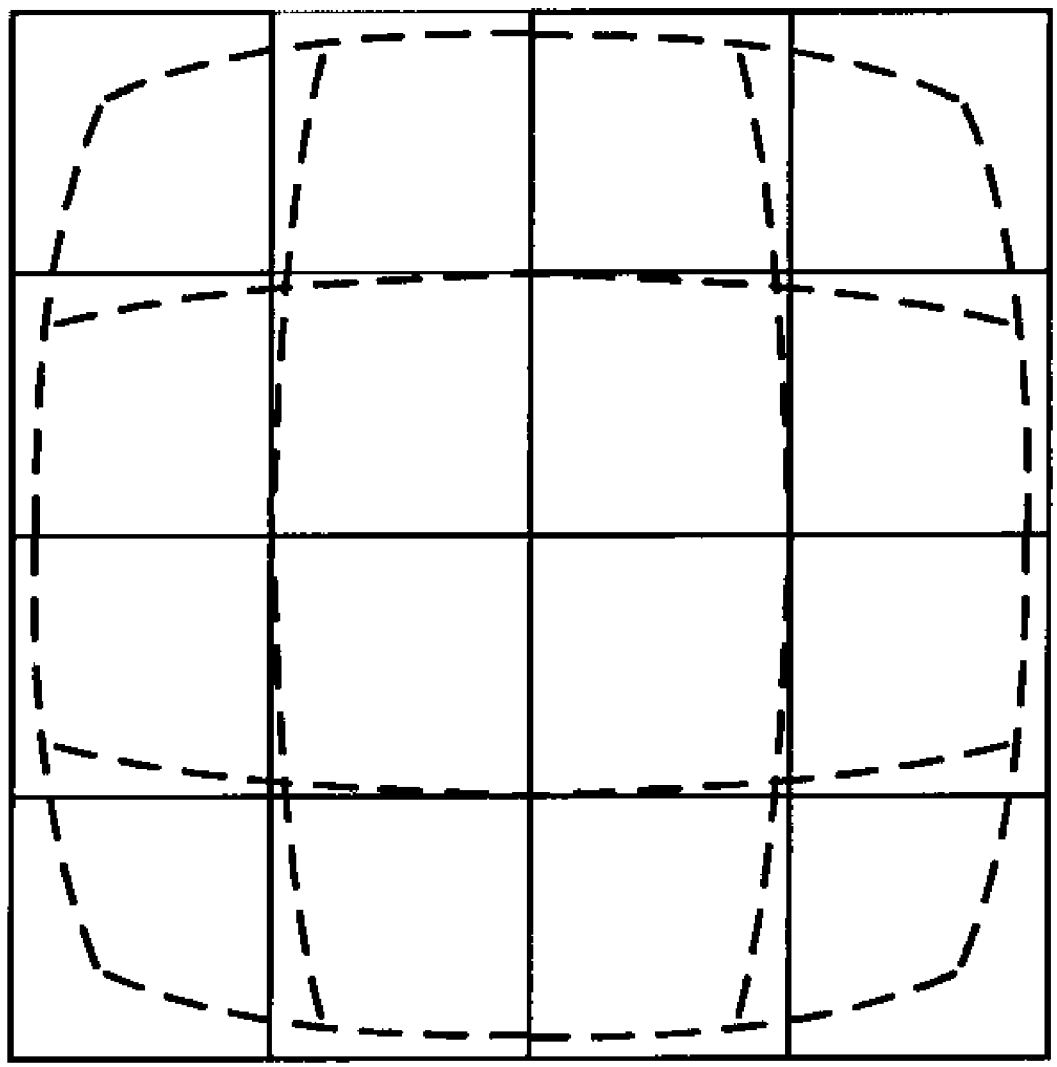
FIG. 9 is an example of the optical system having negative distortion.
Figure 10:
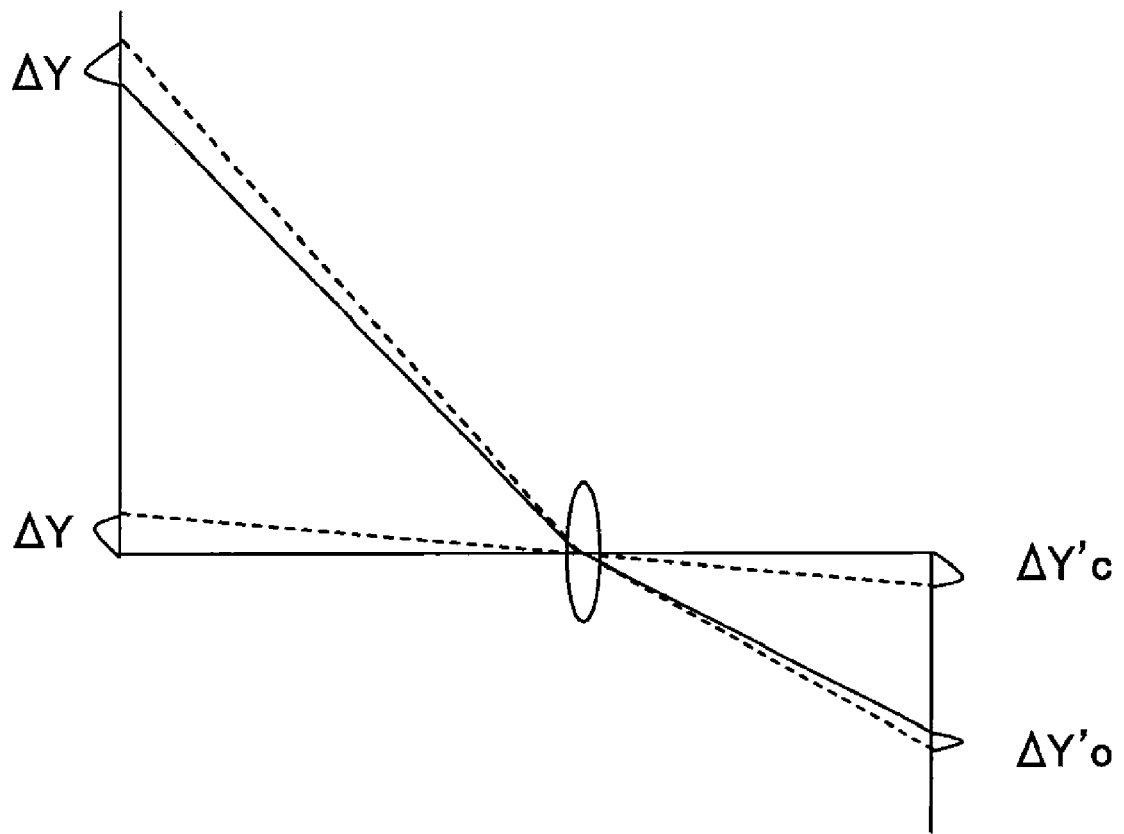
FIG. 10 is a view showing characteristics of the optical system in which distortion is large.
Figure 11:
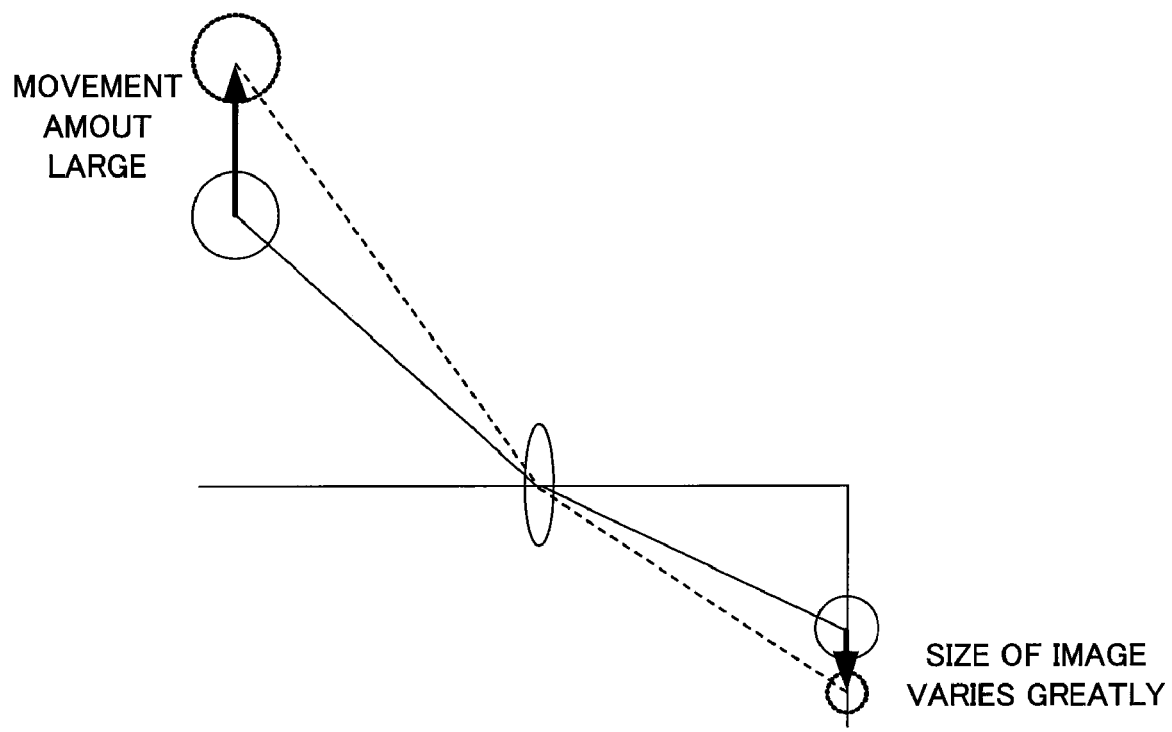
FIG. 11 is another view showing characteristics of the optical system in which distortion is large.

The above-mentioned motion vector of a block having a large local magnification variation amount that should not be detected will now be described in slightly further detail. When an image is captured using a wide-angle optical system having large distortion, such as an endoscope, the local magnification of the optical system varies greatly depending on the position in which an image is formed on an image sensor. For example, when the optical system has negative distortion (barrel distortion), as shown in FIG. 9, and an object having a very small length $\Delta Y$ is captured on an object surface, due to differences in the local magnification of the optical system, an image $\Delta Y'o$ formed on the periphery of the image is smaller than an image $\Delta Y'c$ formed in the center of the image, as shown in FIG. 10. If a motion vector is detected between a plurality of images captured using this type of optical system without considering the local magnification of the optical system, and a large radial direction movement occurs on the image, the size of the object image varies greatly in accordance with the movement in the image position, as shown in FIG. 11. As a result, an inter-block correlation decreases.

With the image processing apparatus according to this embodiment, on the other hand, a motion vector of a block having a large local magnification variation amount is given a low evaluation or excluded, and therefore an accurate, reliable inter-frame representative motion vector can be calculated.

In the above description of the embodiment, it is assumed that the processing performed by the image processing apparatus is hardware processing, but this invention need not be limited to such a constitution. For example, a constitution in which the processing is performed by software may be employed. In this case, the image processing apparatus includes a CPU, a main storage device such as a RAM, and a computer-readable storage medium storing a program for realizing all or a part of the processing described above. Here, the program is referred to as an image processing program. By having the CPU read the image processing program stored on the storage medium and execute information processing/calculation processing, similar processing to that of the image processing apparatus described above is realized.

Here, a computer-readable storage medium denotes a magnetic disk, a magneto-optical disk, a CD-ROM, a DVD-ROM, a semiconductor memory, and so on. Further, the image processing program may be distributed to a computer by a communication line, whereupon the computer executes the received distributed image processing program.

This invention is not limited to the embodiment described above, and may be subjected to various modifications and applications within a scope that does not depart from the spirit of the invention. For example, in the above embodiment, an optical system having barrel distortion is cited as an example, but this invention may be applied to an optical system having pincushion distortion or an optical system having another type of distortion. Further modified examples will be described below.

In this embodiment, as shown in FIG. 5, the image height value of the motion vector measurement region is determined using the center of the image as a reference, but this invention is not limited thereto, and in a modified example, the image height value of the motion vector measurement region may be determined using a substantially central point of the image, or in other words a point existing in the vicinity of the image center, as a reference. In this case, the image processing apparatus sets a distance from the substantially central point of the image to the central coordinate of the motion vector measurement block 51 of the reference frame as the distance IHi shown in FIG. 5, and sets a distance from the substantially central point of the image to the central coordinate of the corresponding block 52 of the subject frame as the distance IHi'. Further, the image processing apparatus determines the distance from the substantially central point of the image to each of the four corners of the image and sets the largest distance of these four determined distances as the maximum image height IHmax. All other processing is identical to the processing described in the embodiment. Similar effects to those of the embodiment can be obtained with this modified example.

Furthermore, in the embodiment, a case in which the shape of the image is rectangular was described, but this invention is not limited thereto, and the image may take any shape. For example, the image may be circular or octagonal. When the image is circular, the point furthest removed from a substantially central point of the image is positioned on a peripheral edge portion of the circular image. When the image is octagonal, the furthest point is positioned on a peripheral edge portion of the octagonal image, or in other words on one of the eight corners. Similar effects to those of the embodiment can be obtained with this modified example also.

The image processing apparatus according to this embodiment uses a value obtained from Equation (8) and Equation (9) as the image height value of the motion vector measurement region in the reference frame and the subject frame. However, in a modified example, a distance between a substantially central point of the image and a single point within the motion vector measurement region may be used as the image height value of the motion vector measurement region. In this case, values of IHRi and IHRi' obtained by substituting 1 for "IHmax" in Equation (8) and Equation (9) serve as the image height values representing the distance. All other processing is identical to the processing described in the embodiment.

In the modified example of the embodiment, the contribution of a motion vector in which the reliability Si is equal to or lower than the predetermined threshold S_Thr is set at 0, but this invention is not limited thereto, and in another modified example, the technical spirit of the invention can be realized by setting the contribution at substantially zero, i.e. a value in the vicinity of 0. In other words, it is sufficient to set the relative contribution of a motion vector in which the reliability Si is equal to or lower than a predetermined threshold as low as possible.

What is claimed is:

1. An image processing apparatus for performing registration processing on a plurality of images by calculating a motion vector between the plurality of images, comprising:
a motion vector measurement region setting unit that sets a plurality of motion vector measurement regions for measuring the motion vector;
a motion vector calculation unit that calculates motion vectors of the plurality of motion vector measurement regions;
a motion vector reliability calculation unit that calculates a reliability of the motion vectors of the plurality of motion vector measurement regions on the basis of information relating to a local magnification of an optical system used to obtain the images; and
a motion vector integration processing unit that determines an inter-image motion vector by integrating the motion vectors of the plurality of motion vector measurement regions in accordance with the reliability of the motion vectors.

2. The image processing apparatus as defined in claim 1, further comprising a magnification variation calculation unit that determines a local magnification variation amount relative to each motion vector by determining the local magnification of the optical system at an origin and an endpoint of each motion vector,
   wherein the motion vector reliability calculation unit calculates the reliability of each motion vector on the basis of the local magnification variation amount.

3. The image processing apparatus as defined in claim 2, further comprising an image height value calculation unit that calculates image height values, which are values relating to an image height of the motion vector measurement region in a reference frame and a subject frame, on the basis of a position coordinate of the motion vector measurement region serving as the origin of the motion vector in the reference frame and a position coordinate of the motion vector measurement region serving as the end point of the motion vector in the subject frame,
   wherein the magnification variation calculation unit determines the local magnification of the optical system at the origin and the end point of the motion vector on the basis of the image height values of the motion vector measurement region in the reference frame and the subject frame.

4. The image processing apparatus as defined in claim 3, wherein the image height value of the motion vector measurement region is a distance between a substantially central point of the image and a single point within the motion vector measurement region.

5. The image processing apparatus as defined in claim 3, wherein the image height value of the motion vector measurement region is a value obtained by dividing a distance between a substantially central point of the image and a single point within the motion vector measurement region by a distance between the substantially central point of the image and a furthest point that is furthest removed from the substantially central point.

6. The image processing apparatus as defined in claim 5, wherein the furthest point is positioned on a peripheral edge portion of the image.

7. The image processing apparatus as defined in claim 1, wherein the motion vector integration processing unit integrates the motion vectors of the plurality of motion vector measurement regions so as to reduce a contribution of a motion vector in which the reliability is low.

8. The image processing apparatus as defined in claim 1, wherein the motion vector integration processing unit integrates the motion vectors of the plurality of motion vector measurement regions such that a contribution of a motion vector in which the reliability is equal to or lower than a predetermined threshold is set at substantially zero.

9. An electronic device comprising the image processing apparatus as defined in claim 1.

10. A non-transitory computer readable storage medium storing an image processing program thereon, the program being executable by a computer to execute registration processing on a plurality of images by calculating a motion vector, wherein the image processing program controls the computer to execute functions comprising:
   setting a plurality of motion vector measurement regions for measuring the motion vector;
   calculating motion vectors of the plurality of motion vector measurement regions;
   calculating a reliability of the motion vectors of the plurality of motion vector measurement regions on the basis of information relating to a local magnification of an optical system used to obtain the images; and
   determining an inter-image motion vector by integrating the motion vectors of the plurality of motion vector measurement regions in accordance with the reliability of the motion vectors.

11. An image processing method of an image processing apparatus for performing registration processing on a plurality of images by calculating a motion vector between the plurality of images, the method comprising:
   setting a plurality of motion vector measurement regions for measuring the motion vector;
   calculating motion vectors of the plurality of motion vector measurement regions;
   calculating a reliability of the motion vectors of the plurality of motion vector measurement regions on the basis of information relating to a local magnification of an optical system used to obtain the images; and
   determining an inter-image motion vector by integrating the motion vectors of the plurality of motion vector measurement regions in accordance with the reliability of the motion vectors;
   wherein the setting the plurality of motion vector measurement regions, the calculating the motion vectors, the calculating the reliability of the motion vectors, and the determining the inter-image motion vectors are performed by a CPU of the image processing apparatus.

\* \* \* \* \*